Reissued Dec. 7, 1943

Re. 22,400

UNITED STATES PATENT OFFICE 22,400

PROCESS OF PRODUCING SOLVENTS

Jacquelin E. Harvey, Jr., Washington, D. C., assignor of one-half to Southern Wood Preserving Company, East Point, Ga., a corporation of Georgia No Drawing. Original No. 2,291,311, dated July 28, 1942, Serial No. 383,461, March 14, 1941. Application for reissue April 26, 1943, Serial No. 484,669

15 Claims. (Cl. 196—53)

The present invention relates to a process for the recovery of valuable liquids from hydrocarbons containing oxygenated compounds.

This application is a continuation in part of my application Ser. No. 345,444, filed July 13, 1940, for a Process of producing solvents, copending herewith, as to all matter common to the two applications.

An object of the present invention is a production of solvents of lower boiling range from hydrocarbons of higher boiling range, said hydrocarbons characterized by content of oxygenated compounds.

Another object of the present invention is the production of solvents of lower boiling range from liquid and solid hydrocarbons of higher boiling range, said liquid and solid hydrocarbons being characterized by the presence of oxygenated organic compounds.

Still another object of the present invention is the conversion of liquid and solid hydrocarbons, substantially in entirety, into solvents of lower boiling range; said liquid and solid hydrocarbons being characterized by content of oxygenated compounds.

A more specific object of the invention is the conversion of tars and fractions thereof, substantially in entirety, into lower boiling solvents of superior quality; said tars and fractions thereof being characterized by the presence of oxygenated organic compounds.

The tars and fractions thereof forming suitable starting material for the process of the present invention are of oxygen content and are derived from coal, wood, petroleum or gas and are characterized by aromatic content; more specifically, gas house tar, water, gas tar, tars derived from coal as for instance coke oven tar and low temperature tar; "Aromatic tars" of petroleum derivation. Selected fractions of the foregoing tars, as for instance pitch or high boiling residues or fractions thereof, serve as suitable starting material.

Coal tar products, and especially coal tar solvents, are meeting serious competition from petroleum solvents, as for instance solvents of olefinic, and naphthenic character, aromatic extracts of petroleum, and the hydrogenated and/or dehydrogenated naphthas of petroleum. In fact, it is a matter of record that certain coal tar solvents have had to take serious price reductions because of petroleum solvent competition.

Coal tar is an important source of aromatics, available in large quantities and relatively cheap. Conversion of coal tar or fractions thereof, substantially in its entirety, into solvents is a thing much to be desired.

The process of the present invention provides a convenient method for converting said tars or fractions thereof of oxygen content into solvents of high aromaticity, as more fully explained in the following.

The following examples are illustrative only and in no way serve to circumscribe the solvents of possible manufacture from tar or fractions thereof, of oxygen content, as a starting material.

Coal tar containing oxygenated compounds will be shown as the starting material of the cited example, but it is immediately apparent that other tars or fractions thereof of aromatic content, as mentioned in the foregoing, serve as suitable starting materials.

Coal tar is a destructive distillate of coal, generally having a preponderance of fractions boiling above 190° C., a typical specific gravity of 1.120, characterized by content of oxygenated organic compounds, and in its higher boiling range represents molecular complexes that may be viewed as a multiplicity of ring structures.

In my copending application Serial No. 341,593 filed June 20, 1940, a method is described for the conversion of tars or fractions thereof of aromatic content, substantially in their entirety, into superior solvents, said conversion being characterized by being step-wise.

It was further stated in said application that as far as applicant understood the process thereof the same was predicated in the following:

First: by depolymerizing the molecular complexes in step-wise fashion they are finally brought down to the solvents of the invention, without substantial carbon deposit.

Second: That reaction conditions on said molecular complexes, whose solvency is not directly usable, converts said molecular complexes into solvents whose solvency is directly usable, and Third: Said molecular complexes must be, to conform to the invention, depolymerized under conditions that induce no substantial quantity of normally liquid products that are other than of aromatic content. By the term "substantial" as used therein was meant that the products of said invention were at least substantially 50% of aromatic content.

Viewed broadly, said invention provided a process wherein, among other things, coal tar or the like was subjected to the action of hydrogen under controlled conditions whereby, the high molecular complexes of said starting material were reduced, including in size, in step-wise manner substantially in entirety, whereby to produce solvents of lowered and controlled boiling range, said solvents being characterized by having directly usable aromaticity as opposed to the high boiling fractions of said starting material comprising high molecular complexes whose solvency is not directly usable, or partially or totally absent.

The present invention provides a method for enhancing the induction of solvency as described in aforesaid copending application.

It has now been found that when converting tars containing high molecular complexes, said tars being characterized by content of oxygenated organic compounds, to solvents of superior solvency, the induction of solvency is enhanced by provision of specific means for the decomposition of said oxygenated organic compounds contained in said starting material when under the influence of hydrogen.

The present invention provides, among other things, a method whereby tars of oxygen content are converted by the action of hydrogen in step-wise manner to solvents of superior solvency, said conversion being characterized by being effected in the liquid phase in the presence of catalytic material that influences decomposition of oxygenated organic compounds contained in the starting material while under the influence of hydrogen. By the specific provision of the inclusion of a catalytic material or materials adapted to influence decomposition of said oxygenated organic compounds, while subjected to hydrogen action, the process which induces solvency and converts aforenamed tars of oxygen content in a step-wise manner, into aforenamed solvents, is enhanced.

Included among those materials adapted to influence the decomposition of oxygenated organic compounds while holding the starting material containing said oxygenated organic compounds, under the influence of hydrogen, are halids, halogens, and derivatives thereof.

The following examples will serve to illustrate general principles upon which the practice of the present invention is based, as well as the process of the present invention, said practice being characterized by the inclusion of catalytic material or materials, hereinafter referred to as decomposition influencers, adapted to influence the decomposition of oxygenated organic compounds contained in the starting material while said starting material is subjected to the action of hydrogen.

*Example I.*—Coal tar, specific gravity 1.120 and distilling substantially 3% at 210° C. was charged to a bomb designed to withstand high temperature and high pressure; catalyst, tin chloride. Hydrogen was pumped in to an upper pressure of 1475 pounds. Heat was applied to an upper limit of 400° C. and the run continued for in the order of 1 hour, the meanwhile keeping the bomb agitated. At the end of said run the bomb was allowed to cool and the beneficiated tar withdrawn therefrom and inspected. The production of solvent fractions was found to be enhanced as is believed, because of the presence of the decomposition influencer that influenced the decomposition of oxygenated organic compounds contained in the starting tar.

The beneficiated tar, which had been processed in the liquid phase, was distilled to an upper limit of substantially 300° C. whereby to recover substantially 28% as the solvent of the present invention having an aromaticity of in the order of at least 50%. The residue resulting from distillation recovery of the solvent of the present invention, was charged back to the bomb with addition of fresh starting tar to compensate for reduction in volume incidental to said distillation, and the process repeated, in the presence of similar catalytic material. The beneficiated material was again distilled to an upper limit of substantially 300° C. to recover the distillate as the desired solvent having an aromaticity of in the order of not less than 50%. Recurring cycles of hydrogenation and distillation were effected to the end that the starting material, substantially in its entirety, neglecting manufacturing and gas loss, was converted to the solvent of the present invention having an aromaticity of substantially 50% or more.

As compared to the process described in aforesaid copending application, the induction of the solvents of the present invention is enhanced due to the presence of said decomposition influencer that influences the decomposition of oxygenated organic compounds contained in the starting material.

Temperatures of in the excess of 300° C. are preferred, as for instance, a temperature chosen from the range of 300° C. to 500° C.; however, lower temperatures are usable. Pressures chosen from the range above 200 atmospheres are preferred; however, lower pressures are usable.

Thus, under the action of hydrogen while contacting a decomposition influencer, the starting tar under temperature and pressure conditions chosen from in excess of 300° C. and 200 atmospheres, respectively, is converted to solvents boiling (as an example) below 300° C., said solvent being characterized by substantially 50% aromatic content, or more, and being further characterized by being products flowing from step-wise reduction of a multiplicity of rings as aforementioned; said solvents being still further characterized as being that product flowing from ring reduction, including in size, wherein said reduction is accomplished under coordinated time, temperature and pressure conditions that preclude carbonaceous deposition of any substantial precentage. Said carbonaceous deposition referring to any time or period of the process wherein process controls are impressed for multiplicity of ring reduction for formation of the solvent of the present invention.

Said solvents may be further refined, as for instance for reduction of specific gravity, viscosity, etc., which statement includes further action of, or by, hydrogen, which forms no part of the present invention inasmuch as the present invention is only concerned with that treatment of tar in liquid phase in the presence of a decomposition influencer which includes depolymerization of ring multiplicity in the manner described whereby to produce solvents; said solvents being further characterized as being at least partially produced from step-wise reduction of ring multiples that proceeds in such manner as to preclude substantial carbonaceous deposition incidental to said reduction.

Viewed broadly, the present invention provides a process for subjecting tars of oxygen and ring multiplicity content derived from coal, wood, petroleum, or gas to the action of hydrogen while under the influence of a decomposition influencer, one or more times, so as to induce solvency of usable quality, as opposed to ring multiplicities not characterized by solvent utility.

The present invention includes, other than intermittent operation as for instance in a bomb, continuous operation in reaction chamber, a series of chambers, a parallelism thereof, including a multiplicity thereof, wherein said tar is flowed with hydrogen under the influence of said decomposition influencer, under conditions as heretofore stated.

By the term beneficiated as used herein and in the appended claims is meant the starting material, or fraction thereof, at least once subjected to the action of hydrogen while contacting a decomposition influencer for, among other things, depolymerization of ring multiples.

By the term depolymerization is also meant the action of hydrogen on structures containing a plurality of rings whereby to effect reduction, including in size, thus providing the solvents of the present invention.

The solvents of the present invention are not circumscribed by any certain boiling range but are rather characterized by substantial aromaticity as heretofore described, and it will be understood that said solvents may serve as substitutes for benzene, toluene, xylene, naphtha and high flash naphtha and solvents including plasticizers. Some heavy naphthas or solvents currently available have an end point in the order of 360° C. The present invention provides for cutting the solvent at any desired point with subsequent fractionation into desired cuts as may be dictated by commercial necessity. Any or all residues resulting from the distillation step may be recycled.

The phase condition of the present process is preponderantly liquid and is not that phase which gasifies all the starting materials. The term liquid phase may not be technically correct, but as herein used is meant to differentiate from processes that gasify all material to be processed.

The starting materials of the process are not circumscribed by limitations in carbon content, as any of the tars of aromatic content available may be used. Tars of more than usual carbon content may be depolymerized under less severe conditions at first, with more severe conditions progressively applied until maximum reaction conditions are attained.

Suitable starting materials also include stripped tars and topped tars, as for instance tars that have been stripped of their low boiling ends up to 220° C. or higher. Tars of aromatic nature are of varying initial boiling points, as an example, an "Aromatic tar" of petroleum origin whose initial boiling point is in the order of 250° C.

Many modes of practicing the present invention are possible as will be apparent to those skilled in the art. For instance, tar may be stripped of any desired percentage or low ends and the residual mass then treated in accordance with present teachings to provide the products—solvents—of the present invention.

Thus, pitches, hard or soft, are among the starting materials of the process; also included in starting materials of the present process, are those residual portions of tar, more viscous than said parent material, that result from removal of low boiling ends. Viewed broadly, the starting materials of the present process are tars and fractions thereof.

Those skilled in the art know that hydrogenations proceed at low pressures; however, commercial recoveries are best effected at elevated pressures, thus the present invention includes use of pressures as high as practicable. The time of treatment may be as short as 1 hour, or less; however, tars of appreciable carbon content may require longer periods.

The starting materials of the process include tar or tar fractions at least once refined hydrogen.

The solvents of the present invention are varied in boiling range and include any or all of the following ranges:

| Product: | Boiling range, °C. |
|---|---|
| Benzol | 78–120 |
| Toluol | 100–150 |
| Hi-flash naphtha | 150–200 |
| High boiling crudes | 150–290 |
| Plasticizers | 160–360 |

Instead of controlling the process to provide a low end of 78° C. as noted in the benzol shown, processing may be controlled to produce lower boiling products.

The induced solvents of the present process may be further characterized by their containing fractions boiling at least 150° C. to 200° C.

Thus, it will be seen that the process may be carried forward to induce the low boiling points of any of the noted solvents, or others. Inasmuch as solvent specifications are continually changing, and new arts require solvents of constantly changing characteristics, the solvents of the present invention are not characterized by any definite boiling range but are rather characterized by an aromaticity as heretofore explained, and further characterized by being conversion products, at least to a degree, of the high molecular complexes as aforestated.

Pitch, high residues and fractional parts of tar, crude or refined by hydrogen, are also preferred starting materials of the process.

*Example II.*—A coal tar residual product, boiling 15% at 355° C., and having a specific gravity greater than 1, is subjected to the action of hydrogen in the presence of iodoform, with temperature chosen from the range 300–500° C. and a pressure above 50 atmospheres for such a length of time as to induce an initial boiling point below 200° C. The beneficiated material is distilled to an upper limit of 290° C. to recover the solvent of the present invention, said solvent characterized by having an aromaticity of in the order of 50% or more. The residue resulting from said distillation being recycled to the end that substantially total conversion, as heretofore noted, is effected; said conversion products are also characterized by an aromaticity of in the order of 50% or more.

Thus, it will be seen that the present invention broadly includes subjecting tar fractions boiling predominantly above 190° C. to the action of hydrogen with temperature and pressure conditions so coordinated as to produce liquid phase whereby to induce solvents of substantial aromatic percentage, said solvents being characterized by being step-wise conversion products of molecular complexes, said molecular complexes having been subjected to process variables in such manner as to provide substantially total conversion.

The step-wise conversion of the starting material also includes conversion of lower boiling fractions to the solvents of the present invention, which statement is predicated on the substantially total conversion of the starting materials to solvents.

*Example III.*—It has been discovered that when subjecting certain mixtures of refined coal tar fractions to the action of hydrogen in accordance with the present process for the production of solvents and/or plasticizers that the formerly accepted teaching that product increment, depolymerization and/or hydrogen absorption are linear functions of the time, is not followed.

When subjecting a mixture of crude coal tar fractions boiling predominantly above 250° C. or 275° C. to the action of hydrogen, research has disclosed that the newly induced products, depolymerization and/or hydrogen absorption are linear functions of the time. As an example, when the above mixture of crude coal tar fractions is subjected to the action of hydrogen for 2-, 5-, and 8-hour periods, the newly induced products, depolymerization and/or hydrogen absorption were linear functions of the time element.

One of the preferred starting materials of the present process is a mixture of refined coal tar fractions boiling predominantly above 355 or 380° C. Such a starting material is conveniently the final residue, resulting from evaporating tar to dryness or substantial dryness and then stripping wood preservative from the distillate. This final residue mass of refined coal tar fractions is an especially suitable refined pitch to be used as starting material of the present process. However, in contradistinction to the mixture of crude tar fractions boiling predominantly above 250 or 300° C., when the aforenamed preferred starting material is subjected to the action of hydrogen for production of solvents and/or plasticizers, the newly induced fractions, depolymerization and/or hydrogen absorption are not, as described for the other mixture of crude tar fractions, linear functions of the time. A critical period of treatment by or with hydrogen exists, and which if exceeded causes loss of newly induced fractions, polymerization and/or lessened hydrogen absorption on certain fractions of the preferred starting material under treatment.

The critical time element because of the obvious possible variations in the characteristics of the aforenamed refined pitch cannot be spoken of as an arbitrary figure. It can be stated, however, that if the refined coal tar pitch were to be subjected to the action of hydrogen for such a length of time, which for other crude coal tar fractions would illustrate that the newly induced fraction, depolymerization and/or hydrogen absorption were linear functions of the time element, loss of induced products, polymerization and/or lessening of hydrogen absorption would occur. When treating the refined coal tar pitch by or with hydrogen, the critical time element is in the order of about three hours.

In the disclosures made herein and in the appended claims distillate removal of low boiling portions from the beneficiated material is considered the equivalent of fractional removal by gas movement, solvent action or the like. The converse also obtains.

The refined pitch boiling predominantly above 380° C., having a specific gravity greater than 1, and characterized by content of oxygenated compounds, ring multiplicities and molecular complexes is subjected to the action of hydrogen in the presence of iodoform as a catalyst, with temperature chosen from a range 300 to 500° C. and a pressure above 50 atmospheres for such a length of time as to induce an initial boiling point not above 250° C. In order to preclude loss of newly induced fractions and polymerization the period of treatment must be selected at or below the critical time period which is in the order of about three hours. The beneficiated material is distilled to an upper limit of 290° C. to recover the solvent of the present process, said solvent being characterized by lowered oxygen content, viscosity and specific gravity and having an aromaticity and/or ring structure in the order of 50% or more. The residue resulting from said stripping action may be recycled to the end that substantially total conversion of that percentage remaining liquid, as heretofore noted, is effected; said total conversion products are also characterized by an aromaticity and/or ring structures of in the order of 50% or more, and are further characterized as those products flowing from reduction including in size of the ring multiples of the starting material.

As noted above, the recovery of the solvent of the present process at a temperature of 290° C. is for purposes of illustration only. The solvent may be recovered at a temperature as dictated by the need at hand.

Catalysts assist in speeding and directing the desired reaction of the process of the present invention. In addition to catalyst previously mentioned, all hydrogenating catalysts are usable therewith, but those having substantial sulphur poisoning immunity are desirable; metals of the sixth or eighth group (periodic) or compounds thereof, such as sulfides and/or oxides. Various catalyst forms may be used, such as various shapes; deposited in well-known manners on carriers; cobalt, tin, molybdenum, vanadium, chromium, or their compounds, promoted or in admixtures, as for instance with small amounts of acids and/or halogen derivatives; all catalyst of known hydrogenating efficacy in the form of shapes, pellets, extruded lengths, comminuted; deposited on carriers; with or without the presence of other materials possessing hydrogenating properties, or not, such as asbestos, lumps of brick, quartz, etc.

Recovery of the induced solvents by means other than distillation is herein considered as the equivalent of distillation recovery.

An especially advantageous manner of utilizing the refined pitch as the starting material of the present process is to first depolymerize it with a solvent, as for instance a refractory solvent; any solvent capable of effecting, at least to a degree, said depolymerization may be employed. Solvent percentage up to volume for volume, or more, may be employed. The solvent and solute are then subjected to process variables as heretofore set forth.

The decomposition influencer which it is desired to have present in the reaction zone is generally taken between 0.1 and 4 or 5 per cent, based on the feed stock, and is preferably taken between 0.1 and 1.5 per cent.

Halogens, halids and derivatives thereof are employed for catalytic purposes noted in the foregoing; however, also may be employed substances furnishing under the process conditions a halogen or a hydrogen halid. Ammonium chloride may be employed, also halogen compounds of coal tar oils or the like, as for instance the iodides or bromides. Also may be employed acids, such as nitric, sulphuric, sulphonic, formic and acetic.

The addition of the decomposition influencer may be made prior to the entry of the feed stock into the reaction chamber, or at any suitable time, as for instance after the charging stock has been heated.

Equivalent amounts of compounds furnishing halogen or hydrogen halid may be employed.

The evaluation of solvent power is conveniently accomplished by finding the well-known aniline point or kauri butanol number. The evaluation of plasticizing properties is conveniently accomplished by recourse to methods suggested in Chapter VI, "The Technology of Solvents" by Dr. Otto Jordan, Mannheim, Germany, translated by Alen D. Whitehead, Chemical Publishing Company of New York, Incorporated, New York, New York.

Intermittent and/or batch operation, which statement broadly covers combinations thereof, may be incorporated in the foregoing examples, or obvious mechanical or chemical equivalents may be substituted within the spirit of the present invention.

I claim:

1. In the production of a solvent from the refined pitch produced by stripping high temperature coal tar to at least about substantial dryness, and fractionating the overhead material to recover a liquid useful as a wood preservative, and a higher boiling fraction boiling predominantly above 355° C., the process which comprises: subjecting said higher boiling fraction to the action of hydrogen at a pressure in excess of 50 atmospheres and a temperature selected between the limits of 300–500° C. in the presence of a catalyst selected from the group consisting of halogens, halids and derivatives thereof for a period not in excess of about three hours, whereby to avoid loss of newly induced fractions, to provide a solvent.

2. In the production of a solvent from the refined pitch produced by stripping high temperature coal tar to at least about substantial dryness, and fractionating the overhead material to recover a liquid useful as a wood preservative, and a higher boiling fraction boiling predominantly above 355° C., the process which comprises: subjecting said higher boiling fraction to the action of hydrogen in the presence of a catalyst selected from the group consisting of halogens, halids and derivatives thereof for a period not in excess of about three hours, whereby to avoid loss of newly induced fractions; and fractionating the beneficiated material to provide low boiling fractions as a solvent.

3. The process of claim 2 with the inclusion of recycling the residue.

4. In the production of a solvent from the refined pitch produced by stripping high temperature coal tar to at least about substantial dryness, and fractionating the overhead material to recover a liquid useful as a wood preservative, and a higher boiling fraction boiling predominantly above 355° C., the process which comprises: subjecting said higher boiling fraction to the action of hydrogen at a pressure in excess of about 50 atmospheres in the presence of a catalyst selected from the group consisting of halogens, halids and derivatives thereof for a period not in excess of about three hours, whereby to avoid polymerization, to provide a solvent.

5. In the production of a solvent from the refined pitch produced by stripping high temperature coal tar to at least about substantial dryness, and fractionating the overhead material to recover a liquid useful as a wood preservative, and a higher boiling fraction boiling predominantly above 355° C., the process which comprises: subjecting said higher boiling fraction to the action of hydrogen at a temperature chosen between 200° C. and 600° C., and a pressure in excess of about 50 atmospheres while in the presence of a catalyst selected from a group consisting of halogens, halids and derivatives thereof for a period not in excess of about three hours, whereby to avoid lowered hydrogen absorption, to provide a solvent.

6. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction to the action of hydrogen in the presence of a catalyst selected from the group consisting of halogens, halids and derivatives thereof for a period not in excess of about three hours, whereby to avoid loss of newly induced fractions, to produce a solvent.

7. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction to the action of hydrogen in the presence of a catalyst selected from the group consisting of halogens, halids and derivatives thereof for a period not in excess of about three hours, whereby to avoid loss of newly induced fractions; and fractionating the beneficiated material to provide low boiling fractions as a solvent.

8. The process of claim 7 with the inclusion of recycling the residue.

9. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction to the action of hydrogen at a pressure in excess of about 50 atmospheres in the presence of a catalyst selected from the group consisting of halogens, halids and derivatives thereof for a period not in excess of about three hours, whereby to avoid polymerization, to produce a solvent.

10. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction to the action of hydrogen in the presence of a catalyst selected from the group consisting of halogens, halids and derivatives thereof at a temperature chosen between 200° C. and 600° C., a pressure in excess of about 50 atmospheres and for a period not in excess of about three hours, whereby to avoid lowered hydrogen absorption, to provide a solvent.

11. In the production of a solvent from the refined pitch produced by stripping high temperature coal tar to at least about substantial dryness, and fractionating the overhead material to recover a liquid useful as a wood preservative, and a higher boiling fraction boiling predominantly above 355° C., the process which comprises: subjecting said higher boiling fraction to the action of hydrogen at a pressure in excess of 50 atmospheres and a temperature selected between the limits of 300–500° C. in the presence of a catalyst selected from the group consisting of halogens, halids and derivatives thereof for a period not in excess of about three hours, whereby to avoid loss of newly induced fractions; and fractionating the beneficiated material to provide low boiling fractions as a solvent.

12. In the production of a solvent from the refined pitch produced by stripping high temperature coal tar to at least about substantial dryness, and fractionating the overhead material to recover a liquid useful as a wood preservative, and a higher boiling fraction boiling predominantly above 355° C., the process which comprises: subjecting said higher boiling fraction to the action of hydrogen at a temperature selected between 300–500° C. and a pressure in excess of about 50 atmospheres in the presence of a catalyst selected from the group consisting of halogens, halids and derivatives thereof for a period not in excess of about three hours, whereby to avoid polymerization to provide a solvent.

13. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction to the action of hydrogen at a pressure in excess of 50 atmospheres and a temperature selected between the limits of 300–500° C., in the presence of a catalyst selected from the group consisting of halogens, halids and derivatives thereof for a period not in excess of about three hours, whereby to avoid loss of newly induced fractions, to produce a solvent.

14. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction to the action of hydrogen at a pressure in excess of 50 atmospheres and a temperature selected between the limits of 300–500° C., in the presence of a catalyst selected from the group consisting of halogens, halids and derivatives thereof for a period not in excess of about three hours, whereby to avoid loss of newly induced fractions; and fractionating the beneficiated material to provide low boiling fractions as a solvent.

15. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction to the action of hydrogen at a pressure in excess of about 50 atmospheres and a temperature selected between the limits of about 300–500° C. in the presence of a catalyst selected from the group consisting of halogens, halids and derivatives thereof for a period not in excess of about three hours, whereby to avoid polymerization, to produce a solvent.

JACQUELIN E. HARVEY, JR.